US008402685B1

(12) United States Patent
Marshall

(10) Patent No.: US 8,402,685 B1
(45) Date of Patent: Mar. 26, 2013

(54) WATERFOWL DECOY APPARATUS AND METHOD OF MAKING

(76) Inventor: Gary S. Marshall, Temple Terrace, FL (US)

(\*) Notice: Subject to any disclaimer, the term of this patent is extended or adjusted under 35 U.S.C. 154(b) by 506 days.

(21) Appl. No.: 12/589,922

(22) Filed: Oct. 30, 2009

(51) Int. Cl.
A01M 31/06 (2006.01)
A01M 29/06 (2011.01)

(52) U.S. Cl. .................................................... 43/3; 43/2
(58) Field of Classification Search .............. 43/1–3;
428/98, 156, 174, 187, 195.1; 116/22 A;
40/421, 422; 446/176, 217; 359/525
See application file for complete search history.

(56) References Cited

U.S. PATENT DOCUMENTS

| 942,103 A | 12/1909 | Rigney |
| 1,089,003 A * | 3/1914 | Mayerle .................. 40/613 |
| 2,722,195 A | 11/1955 | Rockafeller |
| 2,791,281 A * | 5/1957 | Boyd ..................... 416/204 R |
| 3,041,765 A * | 7/1962 | Paar ............................ 428/5 |
| 3,085,545 A | 4/1963 | Ore |
| 4,597,357 A | 7/1986 | LeMessurier |
| 4,884,328 A * | 12/1989 | Neighbors ................ 29/401.1 |
| 5,144,764 A | 9/1992 | Peterson |
| 5,832,649 A | 11/1998 | Kilgore |
| 5,862,619 A | 1/1999 | Stancil |
| 6,381,896 B1 | 5/2002 | Coker |
| 6,449,894 B1 | 9/2002 | Price, Sr. et al. |
| 6,484,431 B2 | 11/2002 | Price, Sr. et al. |
| 6,510,644 B1 | 1/2003 | Gollnik |
| 6,574,904 B1 | 6/2003 | Fencel et al. |
| 6,640,413 B1 | 11/2003 | Martin et al. |
| 6,640,483 B2 | 11/2003 | Nelson |
| 6,782,653 B1 | 8/2004 | Thomas |
| 6,807,765 B2 | 10/2004 | Watermann |
| 6,907,688 B2 | 6/2005 | Brint |
| 7,137,221 B2 | 11/2006 | Highby et al. |
| 7,458,181 B2 | 12/2008 | Butz |
| 2002/0069572 A1 | 6/2002 | Price, Sr. et al. |
| 2002/0095847 A1 | 7/2002 | Nelson |
| 2003/0041500 A1 | 3/2003 | Thomas |
| 2003/0097973 A1* | 5/2003 | Fremstad .................. 116/22 A |
| 2003/0101635 A1 | 6/2003 | Fencel et al. |
| 2003/0121198 A1 | 7/2003 | Watermann |
| 2003/0208944 A1 | 11/2003 | Olson et al. |
| 2004/0237373 A1 | 12/2004 | Coleman |
| 2005/0150149 A1 | 7/2005 | Highby et al. |
| 2007/0137092 A1 | 6/2007 | Butz |
| 2008/0184610 A1 | 8/2008 | Pfeifle |
| 2008/0216382 A1 | 9/2008 | Rohrke |

FOREIGN PATENT DOCUMENTS

GB 2026829 A * 2/1980

\* cited by examiner

Primary Examiner — Darren W Ark
Assistant Examiner — Kathleen Iwasaki
(74) Attorney, Agent, or Firm — Frijouf, Rust & Pyle, P.A.

(57) ABSTRACT

A waterfowl decoy apparatus is disclosed for attracting a waterfowl. The waterfowl decoy apparatus comprises a blade having a generally sinusoidal cross-section for defining a first concave portion, a second concave portion and an inflection axis. A dark pigment is on a first side of the blade. A light pigment is on a second side of the blade. A first end of a hanger is secured to an object. A swivel couples a second end of the hanger to a top edge of the blade for rotating the blade relative to the hanger. The flow of air contacts the blade for rotating the blade. The dark pigment and the light pigment create an oscillating image upon rotating of the blade for attracting the waterfowl.

4 Claims, 10 Drawing Sheets

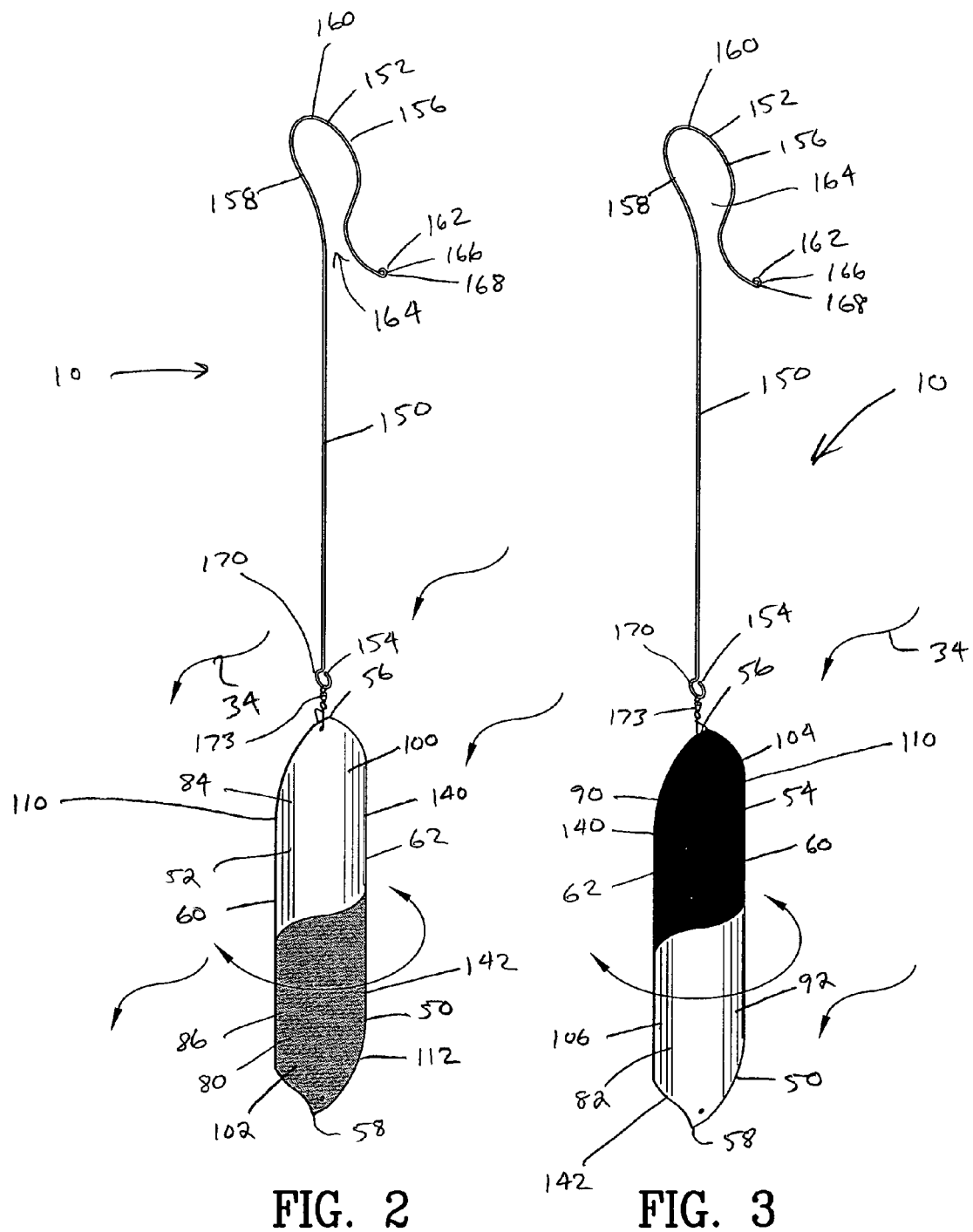

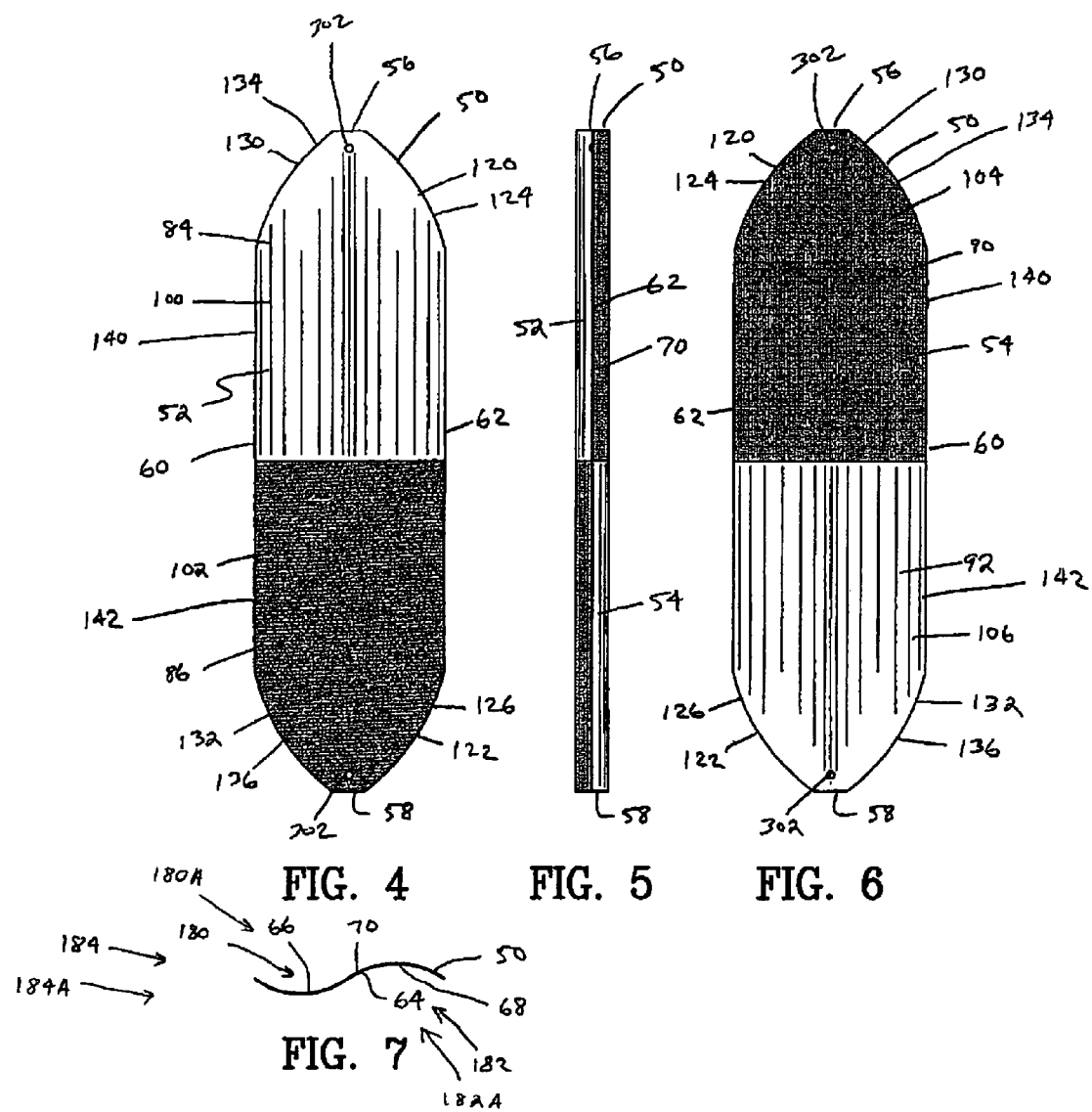

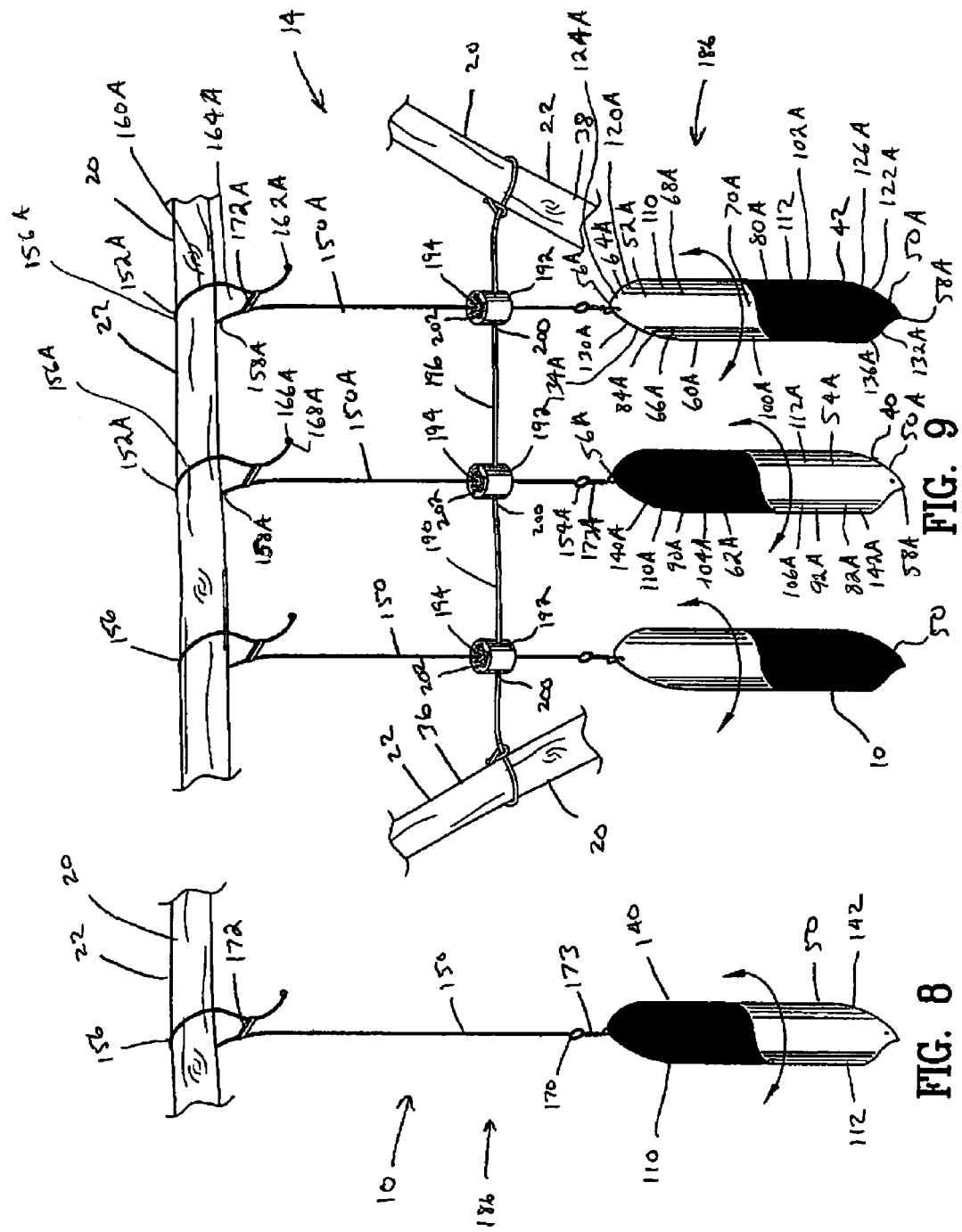

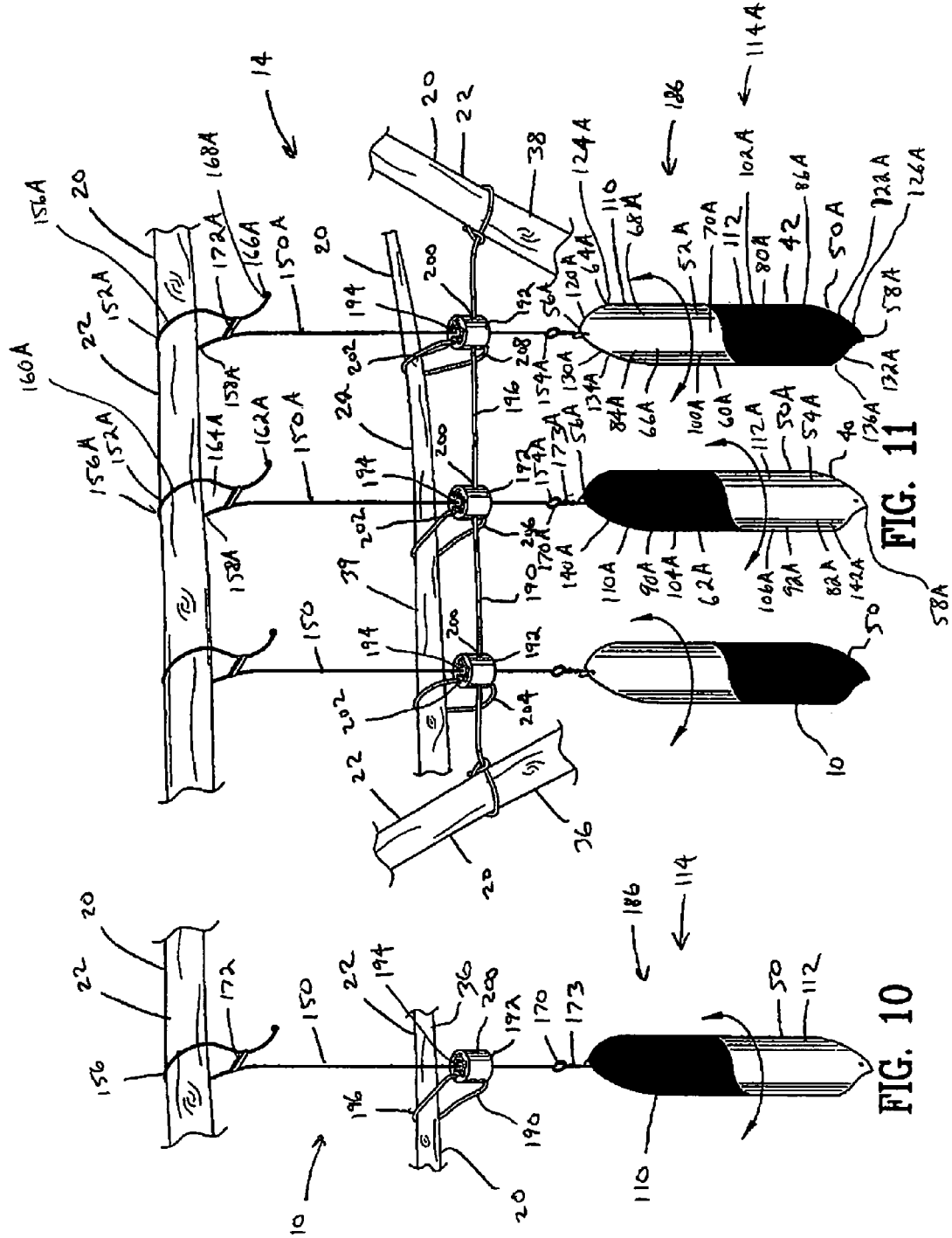

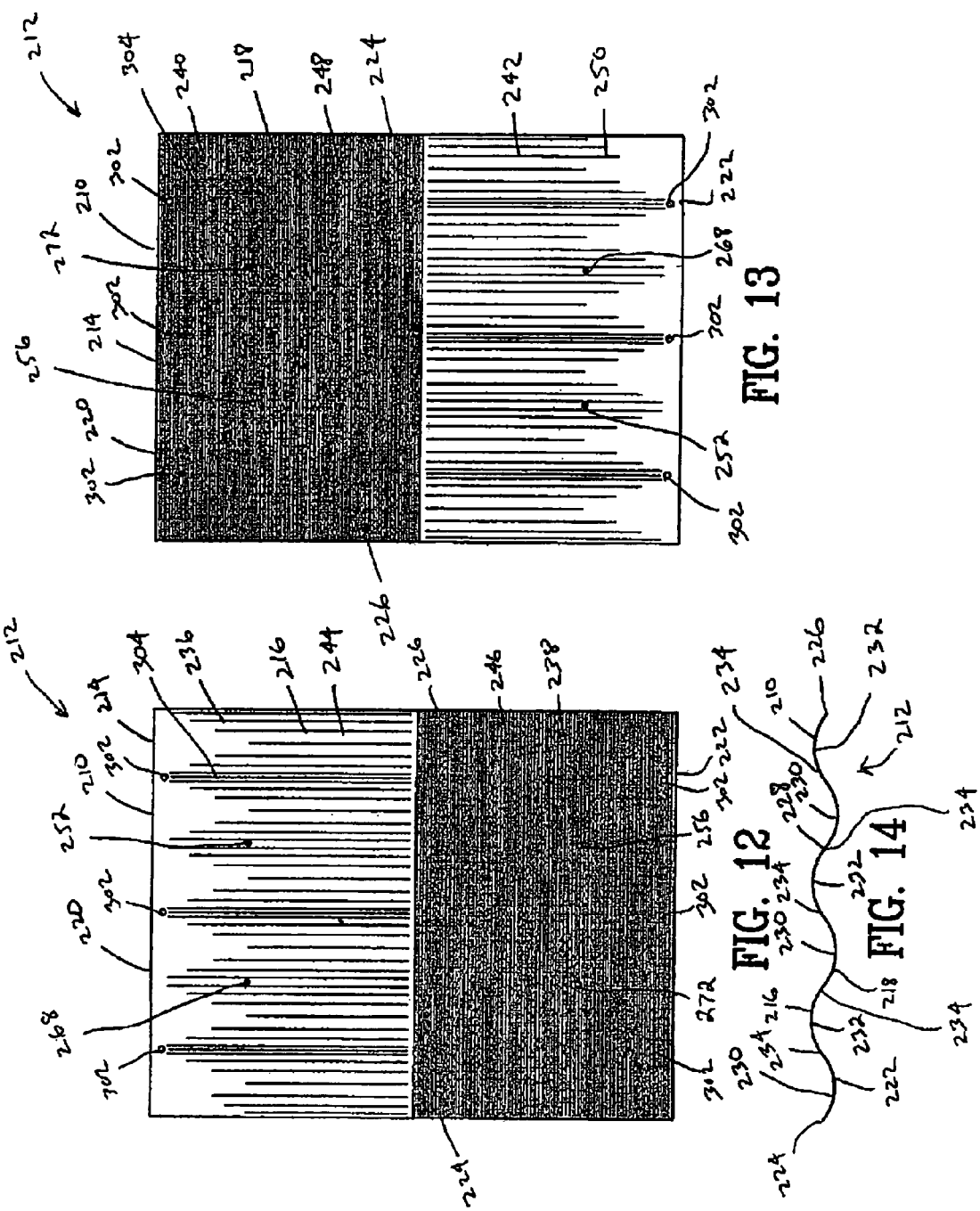

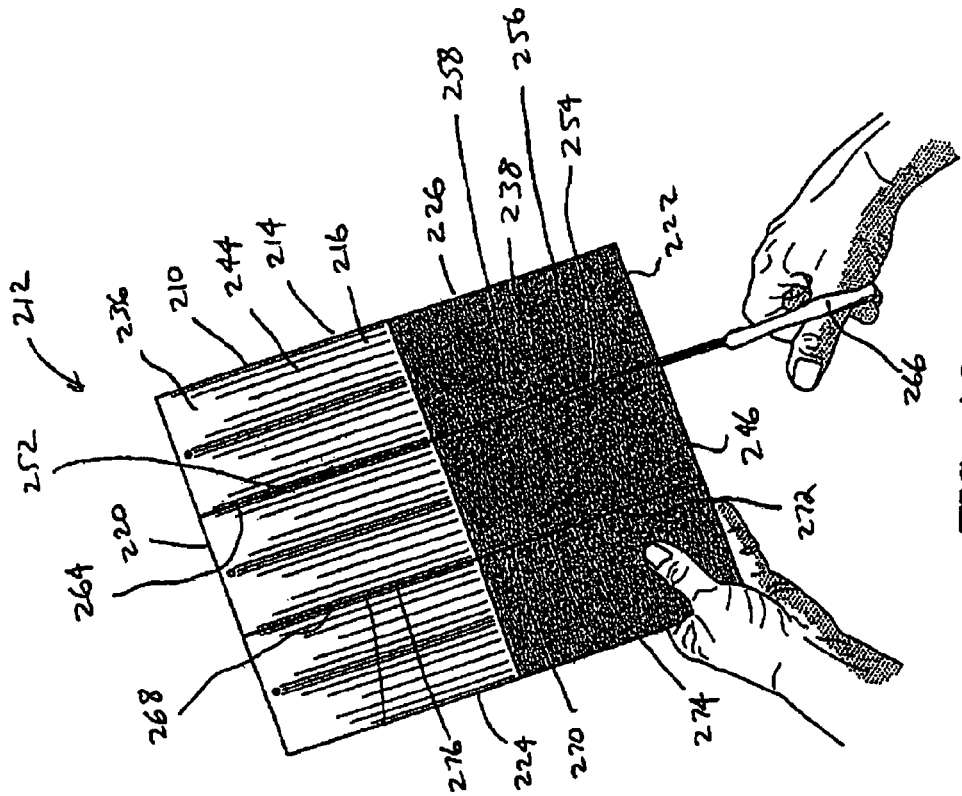
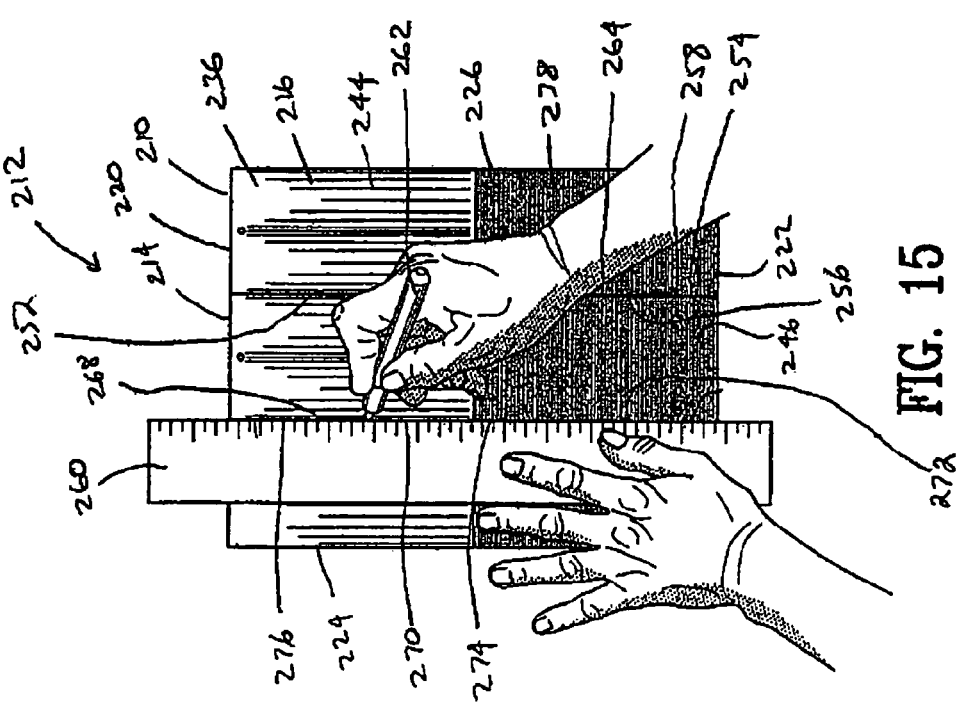

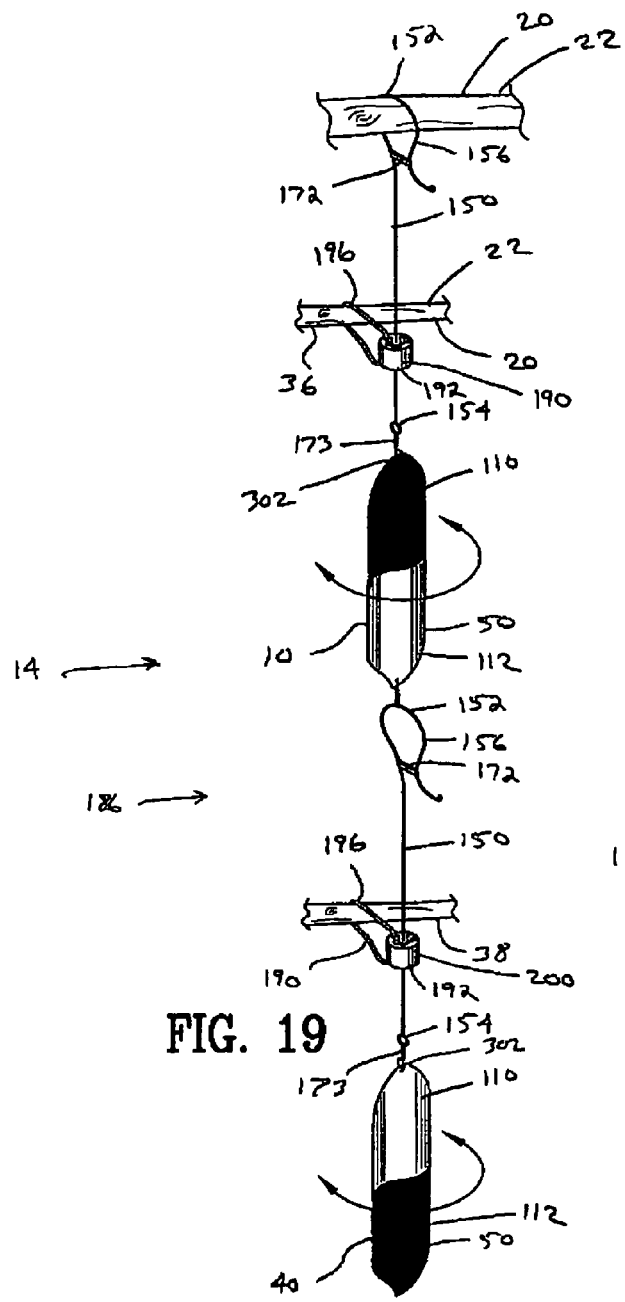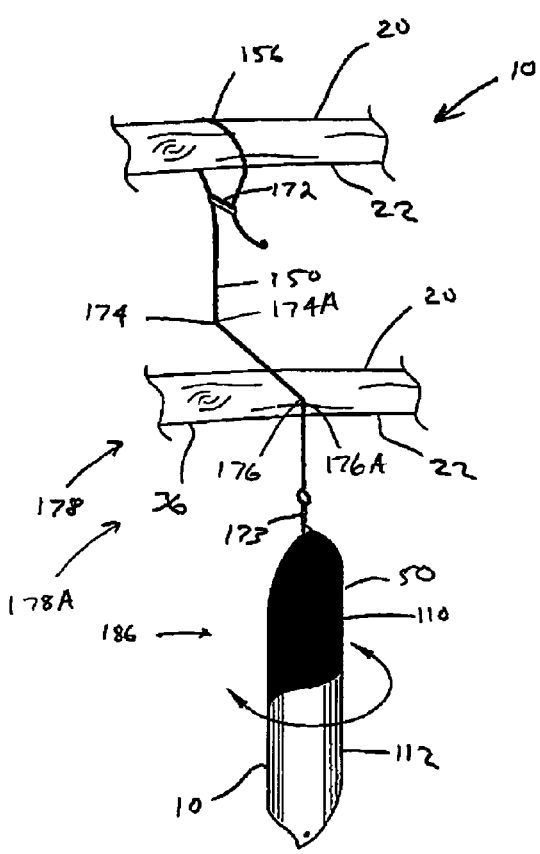
FIG. 19
FIG. 20

WATERFOWL DECOY APPARATUS AND METHOD OF MAKING

BACKGROUND OF THE INVENTION

1. Field of the Invention

This invention relates to decoys and more particularly to a waterfowl decoy apparatus and method of making.

2. Background of the Invention

At least a thousand years before Europeans arrived in North America, the indigenous Indians had discovered the use of decoys to lure birds and animals closer too the hunter. Early decoys comprised bird skins on floats or sticks. Decoys have been an essential part of the bird hunters equipment since that time. More durable decoys were desired and many variations including carved decoys emerged as is well known to those skilled in the art. The sophistication of some decoys has emerged to the point that they are almost indistinguishable from their live counterparts. Theses types of decoys are rather costly, and a less expensive bird attractant was desired. The development of a low cost yet effective bird decoy has remained a challenge to those skilled in the art.

A variety of decoy devices has emerged which attempt to attract birds by mimicking their flight motions. Some of these devices required mechanical means of motion, while others were driven by wind currents. There have been many in the prior art who have attempted to solve these problems with varying degrees of success. None, however completely satisfies the requirements for a complete solution to the aforestated problem. The following U.S. Patents and Patent Applications are attempts of the prior art to solve this problem.

U.S. Pat. No. 942,103 to Rigney discloses novel apparatus by means of which pieces of card board or other suitable material, cut or formed to represent different birds, are caught and removed by the players from a platform provided with slots, in which the birds are supported. The removal of the birds is accomplished by the use of a pair of angle pieces, made to represent wings, which are adapted to slip over the backs of the birds.

U.S. Pat. No. 2,722,195 to Rockafeller discloses a device designed for frightening away birds and animals from locations where such birds and animals frequently destroy property. An important object of the invention is to provide a device of this character which is especially designed for positioning on power or telephone poles for frightening birds.

U.S. Pat. No. 3,035,545 to Ore discloses guarding and fright producing devices and equipment and particularly to a special scarecrow. The main object of my invention is to produce a scarecrow of especially effective character which serves to scare off birds and smaller animals where used in orchards and fields of growing greens. An ancillary object of my invention is to provide a scarecrow which utilizes several features simultaneously in order to obtain a cumulative effective in scaring off undesirable animals from all gardens and orchards equipped with such scarecrows.

U.S. Pat. No. 4,597,357 to LeMessurier discloses a Bird Scare comprised of a sheet of aluminium supported by a swivel and having both a twist and turned edges to enable sensitive response to effect rotation in very light rising air as well as rotation on gentle conventional wind and high wind conditions. The sheet material includes domes impressed throughout the material to increase reflective dissipation effect.

U.S. Pat. No. 5,144,764 to Peterson discloses a decoy with a pair of flexible wings and a body which includes means for orienting the decoy into the wind. The wings are flexibly mounted to the body and fluctuate in response to air flow over the wing between a lower position wherein the wings define airfoils which generate lift and an upper position wherein the wings are oriented in a stall configuration causing the wings to fall.

U.S. Pat. No. 5,832,649 to Kilgore discloses a decoy mobile having a mobile spreader suspended a predetermined distance from the ground by attachment to a fixed object. The decoy mobile further has at least one mobile lower line attached at an upper end to the mobile spreader. The at least one mobile lower line is further securely attached to a mobile anchor line which is securely attached to a mobile anchor line fastener. The decoy mobile further has at least one decoy securely attached to the at least one mobile lower line. The at least one decoy rotates when contacted by wind simulating a real animal.

U.S. Pat. No. 5,862,619 to Stancil discloses the appearance of symmetrical lateral movement such as the flapping of a bird's wings by a rotating vane which has a light side and a dark side. The vane is generally elliptical in shape and is divided into two blades. Each of the blades is curled about an axis which is generally parallel to the axis of rotation of the vane. Accordingly, rotation of the vane alternately shows the light and dark sides of the vane such that the light side of the vane appears from a distance to be moving along the axis of rotation about the center of the axis of rotation. The vane is rotatably attached to an animal decoy, such as a duck decoy, by a support. The curvature of the vane causes the vane to rotate in response to a wind force. During rotation, the top of the vane moves away from the head of the decoy and the bottom of the vane moves toward the head such that any lift generated by rotation of the vane is directed upwards to lift the decoy slightly out of the water rather than drive the decoy into the water. A motor can supply rotational force to the vane in the absence of wind force.

U.S. Pat. No. 6,381,896 to Coker discloses a waterfowl decoy that can be assembled from a flat, planar sheet to a 3-dimensional decoy that is capable of stacking while assembled. Decoy comprises a sheet and an anchor. The sheet has an outer periphery shaped to resemble a waterfowl when the sheet is assembled in a 3-dimensional state, with a head, body and shoulder. The sheet substantially symmetrical about a longitudinal axis, except for a bifurcated head. The head has a pair of members that are specifically asymmetrical to appear more realistic. The sheet also has a pair of shoulder segments that are aligned by flexing the sheet along the longitudinal axis and securing using an anchor. A plurality of decoys may be stacked, while in a fully assembled state and with anchors intact. While stacked, the anchors may be moved to a position that locks the stack so that individual decoys cannot be removed until the anchors are moved to a position that releases the stack.

U.S. Pat. No. 6,449,894 to Price, Sr, et al. discloses a decoy apparatus with wind-driven rotatable wings. The rotatable wings are mounted on a shaft member, which extends transversely through a bird-like body portion. Adjustable-pitch rotor blades are integrally mounted on the rotatable wings for collecting and converting kinetic wind energy to rotational power in the shaft member. When collected and converted to rotational power, wind energy causes the wings, the shaft member and the rotor blades to rotate in unison through 360 degrees about a horizontal axis of rotation extending through the shaft member. The wings and integrally mounted rotor blades co-rotate in a clockwise direction or in a counter-clockwise direction depending on the wind energy being directed against the rotor blade members. The adjustable pitch rotor blade members thus create wing movement in the wings and in the rotor blades for alluring game located vertically, laterally and longitudinally relative to the decoy apparatus.

U.S. Pat. No. 6,484,431 to Price, Sr. et al. discloses a decoy apparatus with wind-driven rotatable wings. The rotatable wings are mounted on a shaft member, which extends transversely through a bird-like body portion. Head-on horizontal-axis rotor blades are integrally mounted on the rotatable wings for collecting and converting kinetic wind energy to rotational power in the shaft member. When collected and converted to rotational power, wind energy causes the wings, the shaft member and the rotor blades to rotate in unison through 360 degrees about a horizontal-axis of rotation extending through the shaft member. The wings and integrally-mounted rotor blades co-rotate in a clockwise direction or in a counter-clockwise direction depending on the wind energy being directed against the rotor blade members. The rotor blade members thus create wing movement in the wings and in the rotor blades for alluring game located vertically, laterally and longitudinally relative to the decoy apparatus.

U.S. Pat. No. 6,510,644 to Gollnik discloses a deer tail decoy which simulates the communicating and motion characteristics of a deer's tail. The decoy includes flexible and paired front and rear tail-shaped light colored background and dark inlaid materials, each of which is frayed or slit about their peripheral margins to provide contrasting inner and outer flaps which flutter in the wind. The top section of the decoy includes a rigid support such as a wire so as to permit the decoy to flag in the wind. When secured to a mounting site with a cord or wire, the wind blown deer tail decoy partially rotates about the wire, swings as a pendulum, ripples through its entire fabric structure and creates contrasting fluttering and flapping in the wind so as to emulate a deer's tail in motion.

U.S. Pat. No. 6,574,904 to Fencel et al. discloses a wind activated decoy having a silhouette body with a wing support therethrough. Opposite first and second wings are secured to respective wing spars, with one spar being removably installable through the support. The second wing attaches removably to the first spar after installation through the support. Each wing comprises a thin, rigid sheet with a sinusoidal cross section to catch the wind and cause the panels to rotate. The chords of the two panels have an angular displacement of forty five degrees, to avoid any singularity and provide continuously unequal aerodynamic forces upon the panels to produce continuous rotation in a breeze. The panels are marked differently on opposite surfaces and when rotated, simulate the flashing of a bird's wings when the bird is alighting. A support column extends from the body and is removably installable in a tubular support, allowing the decoy to pivot freely into the wind.

U.S. Pat. No. 6,640,413 to Martin, et al. discloses an improved hunting decoy made by securing an outer skin around a buoyant core. A buoyant core body is formed from buoyant core material into a shape approximating that of a desired animal. The core body may include a head or be headless. After the buoyant core body has been formed in the desired shape, a rigid outer skin is secured about the buoyant core body. Securing the outer skin is accomplished by vacuum-forming a sheet of deformable material about the buoyant core body.

U.S. Pat. No. 6,640,483 to Nelson discloses a bird decoy apparatus that includes a plurality of flat decoy panels, each panel being shaped to simulate an appearance of a bird. Each of the plurality of decoy panels are attached to a suspension line.

U.S. Pat. No. 6,782,653 to Thomas discloses a waterfowl decoy system used by one or more hunters for simulating large numbers of geese and ducks in a field or on a water surface. The system includes a plurality of decoy pennants attached to a decoy line. A plurality of decoy lines joined in series form a decoy line train. Opposite ends of each decoy line include a snap swivel for preventing the pennants and decoy line from becoming tangled. A portion of the decoy line is attached to a top of a line pole for suspending the decoy pennants above a ground surface or a water surface. Also, a portion of the decoy line can be connected to a decoy line animator for moving the decoy line and pennants from one position to another. The decoy system also includes a backpack or dolly with a vertical hand operated vertical spool for holding the pennants and decoy lines thereon and transporting the decoy system to and from the hunting area.

U.S. Pat. No. 6,807,765 to Watermann discloses a device for scaring birds comprising a silhouette of a bird of prey having at least one hole there through; a first line having one end rotatably attached to said hole.

U.S. Pat. No. 6,907,688 to Brint discloses bird decoys for attracting predators, one of which decoys may be rotatably deployed on a rod with one wing folded, the other wing extended and both moving to simulate a wounded bird. Other embodiments include a mechanical flying bird supported on a rotating arm in a single bird flying configuration, a pair of mechanical flying birds deployed in tandem on a common rotating arm and a stacked flying bird configuration of four birds. A method for attracting predators using bird decoys which simulate dove, quail, crow, hawk, duck, geese or the like, and includes the steps of rotatably deploying a bird decoy with a folded wing on a rod or stake and causing the extended wing to flap and the folded wing to vibrate, thus simulating a wounded bird. The method also includes mounting one or more mechanical flying birds on a rotating arm or arms attached to an upright support for simulating circling of the various decoy birds in selected locations to attract predators.

U.S. Pat. No. 7,137,221 to Highby, et al. discloses a spinning decoy device for use by hunters to attract birds, such as ducks and geese. The device has at least one decoy deployed in an elevated position, and a motorized system for spinning the decoy(s) so as to attract the birds. The motorized system, in a preferred embodiment, spins the decoy(s) in a circular motion. To further add realism to the device, the wings of each decoy are rotatable.

U.S. Pat. No. 7,458,181 to Butz discloses a waterfowl decoy kite designed in a manner that allows for its deployment over a body of water or other potential waterfowl landing area to facilitate the attracting of specific species to the hunter. The kite is made from a an oval wing and circular stabilizer. The wing and stabilizer may have a variety of notches so as to impart bird like characteristics to the kites flight pattern and visual appeal. The kite may also be painted so as to exhibit a bird like appearance during flight.

United States Patent Application 2002/0069572 to Price, Sr., et al. discloses a decoy apparatus with wind-driven rotatable wings. The rotatable wings are mounted on a shaft member, which extends transversely through a bird-like body portion. Adjustable-pitch rotor blades are integrally mounted on the rotatable wings for collecting and converting kinetic wind energy to rotational power in the shaft member. When collected and converted to rotational power, wind energy causes the wings, the shaft member and the rotor blades to rotate in unison through 360 degrees about a horizontal axis of rotation extending through the shaft member. The wings and integrally mounted rotor blades co-rotate in a clockwise direction or in a counter-clockwise direction depending on the wind energy being directed against the rotor blade members. The adjustable pitch rotor blade members thus create wing movement in the wings and in the rotor blades for alluring game located vertically, laterally and longitudinally relative to the decoy apparatus.

United States Patent Application 2002/0095847 to Nelson discloses a bird decoy apparatus that includes a plurality of flat decoy panels, each panel being shaped to simulate an appearance of a bird. Each of the plurality of decoy panels are attached to a suspension line.

United States Patent Application 2003/0041500 to Thomas discloses a waterfowl decoy system used by one or more hunters for simulating large numbers of geese and ducks in a field or on a water surface. The system includes a plurality of decoy pennants attached to a decoy line. The pennants and decoy line form a decoy line train. Opposite ends of the decoy line train include a swivel and a line connector for attaching to another decoy line train. A portion of the decoy line train is attached to a top of each line pole for suspending the decoy pennants above a ground surface or a water surface. One or more of the line poles can be mounted on top of a spring mounted line pole coupling. The line pole coupling is attached to a ground stake. The decoy system also includes a backpack or dolly with a vertical hand operated vertical spool for holding the pennants and decoy line trains thereon and transporting the decoy system to and from the hunting area.

United States Patent Application 2003/0101635 to Fencel discloses a wind activated decoy having a silhouette body with a wing support therethrough. Opposite first and second wings are secured to respective wing spars, with one spar being removably installable through the support. The second wing attaches removably to the first spar after installation through the support. Each wing comprises a thin, rigid sheet with a sinusoidal cross section to catch the wind and cause the panels to rotate. The chords of the two panels have an angular displacement of forty five degrees, to avoid any singularity and provide continuously unequal aerodynamic forces upon the panels to produce continuous rotation in a breeze. The panels are marked differently on opposite surfaces and when rotated, simulate the flashing of a bird's wings when the bird is alighting. A support column extends from the body and is removably installable in a tubular support, allowing the decoy to pivot freely into the wind.

United States Patent Application 2003/0121198 to Watermann discloses a device for scaring birds comprising a silhouette of a bird of prey having at least one hole there through; a first line having one end rotatably attached to said hole.

United States Patent Application 2003/0208944 to Olson, et al. discloses a dynamic, wind powered decoy having a body member (with a longitudinal axis), rod means connected to the body member and extending longitudinally away from the body member, and a wing assembly rotatably mounted on the rod means. The decoy has pivot means in the body member defining a pivot axis at a selected angle from the longitudinal axis. When the decoy is pivotally supported, the wing assembly rotates about the longitudinal axis and the decoy rotates about the pivot axis to a heading whereat the body member is headed into the wind.

United States Patent Application 2004/0237373 to Coleman discloses a bird decoy representing a bird in flight and a support pole for such decoys. The decoy is a top view of a bird flying with outstretched wings, a head, neck, and body made from a single piece of relatively flat material. The decoy has a suspension rod which is attached on one end to the decoy. The free end of the suspension rod is inserted into a hole on a support pole. The support pole has numerous holes along its length for attaching several decoys. Several decoys are attached to the support pole and the pole is positioned vertically from ground level.

United States Patent Application 2005/0150149 to Highby, et al. discloses a spinning decoy device for use by hunters to attract birds, such as ducks and geese. The device has at least one decoy deployed in an elevated position, and a motorized system for spinning the decoy(s) so as to attract the birds. The motorized system, in a preferred embodiment, spins the decoy(s) in a circular motion. To further add realism to the device, the wings of each decoy are rotatable.

United States Patent Application 2007/0137092 to Butz discloses a waterfowl decoy kite designed in a manner that allows for its deployment over a body of water or other potential waterfowl landing area to facilitate the attracting of specific species to the hunter. The kite is made from an oval wing and circular stabilizer. The wing and stabilizer may have a variety of notches so as to impart bird like characteristics to the kites flight pattern and visual appeal. The kite may also be painted so as to exhibit a bird like appearance during flight.

United States Patent Application 2008/0184610 to Pfeifle discloses a method and apparatus for deploying a plurality of aerial decoys. The decoys extend away from the ground at different elevations including launching a kite to a position downwind of the desired observation or hunting zone and attaching aerodynamic bird decoys at a plurality of spaced-apart locations along the ascending kite string to simulate a number of birds approaching the landing zone. The decoys are preferably attached to the kite string through a swivel device and the tethered end of the kite string can be supported above a mast or stake that is securely positioned in the ground or bottom of the body of water on to which the birds are to be attracted. The entire assembly is conveniently provided in kit form that is both manually transportable and can be put into use by one individual.

United States Patent Application 2008/0216382 to Rohrke discloses methods and apparatus for attracting animals. In one aspect, there is provided a wind driven device, such as a decoy for animals, such as waterfowl, birds, humans, and the like. The device may include a support pole; a hanging rod coupled to the support pole; and a blade coupled to a swivel mechanism. The swivel mechanism is further coupled to the hanging rod. The blade is attached to the swivel mechanism and shaped to move to attract one or more animals when the blade moves in response to wind. Related apparatus and methods are also described.

Although the aforementioned prior art have contributed to the development of the art of bird decoys, none of these prior art patents have solved the needs of this art.

Therefore, it is an object of the present invention to provide an improved apparatus for attracting birds.

Another object of this invention is to provide an improved apparatus for attracting birds that is simple for the operator to use.

Another object of this invention is to provide an improved apparatus for attracting birds that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to a waterfowl decoy apparatus for attracting a waterfowl. An object supports the waterfowl decoy apparatus. A flow of air traverses in proximity to the object. The waterfowl decoy apparatus comprises a blade defining a first side, a second side, a top edge, a bottom edge, a primary edge and a secondary edge. The blade has a generally sinusoidal cross-section for defining a first concave portion, a second concave portion and an inflection axis. The inflection axis extends between the top edge and the bottom edge and bisects the first concave portion and the second concave portion. A dark pigment is on the first side of the blade. A light pigment is on the second side of the blade. A hanger extends between a first end and a second end. The first end of the hanger is secured to the object. A swivel couples the second end of the hanger to the top edge of the blade for rotating the blade relative to the hanger. The flow of air contacts the blade for creating a high atmospheric pressure adjacent to the first side of the first concave portion and a low atmospheric pressure adjacent to the second side of the second concave portion. The high atmospheric pressure and the low atmospheric pressure rotates the blade. The dark pigment and the light pigment creating an oscillating image upon rotating of the blade for attracting the waterfowl.

In a more specific embodiment of the invention, the first side includes an upper half portion and a lower half portion. The second side includes an upper half portion and a lower half portion. The upper half portion of the first side has a first light pigment. The lower half portion of the first side has a first dark pigment. The upper half portion of the second side has a second dark pigment. The lower half portion of the second side has a second light pigment. The first light pigment 100 and the second dark pigment 104 create an upper oscillating image 110 upon rotation of the blade 50. The upper oscillating image 110 attracts the waterfowl 12 to the waterfowl decoy apparatus 10. The first dark pigment 102 and second light pigment 106 create a lower oscillating image 112 upon rotation of the blade 50. The lower oscillating image 112 attracts the waterfowl 12 to the waterfowl decoy apparatus 10.

In one embodiment of the invention, a tether extends between the hanger and a second object for maintaining the hanger in a generally vertical position.

In another embodiment of the invention, the primary edge includes a first upper taper and a first lower taper. The first upper taper defines a first arcuate edge extending between the primary edge and the top edge. The first lower taper defines a second arcuate edge extending between the primary edge and the bottom edge. The secondary edge includes a second upper taper and a second lower taper. The second upper taper defines a third arcuate edge extending between the secondary edge and the top edge. The second lower taper defines a forth arcuate edge extending between the secondary edge and the bottom edge. The first arcuate edge and the third arcuate edge form an upper elliptical wing for improving aerodynamic efficiency. The second arcuate edge and the fourth arcuate edge form a lower elliptical wing for improving aerodynamic efficiency.

The invention is also incorporated into the method of aligning a straight edge with the dark pigment dot and the light pigment dot. A line is then inscribed adjacent to the straight edge to illustrate the cutting vector. The line is then cut for separating a first decoy blade from the sheet.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 2 is a magnified view of a first portion of FIG. 1 illustrating a first waterfowl decoy apparatus;

FIG. 3 is a magnified view of a second portion of FIG. 1 illustrating a second waterfowl decoy apparatus;

FIG. 4 is a magnified view of a lower portion of FIG. 2 illustrating a first side of a blade;

FIG. 5 is a side view of FIG. 4;

FIG. 6 is a rear view of FIG. 4;

FIG. 7 is a bottom view of FIG. 4;

FIG. 8 is a view similar to FIG. 3 illustrating a hanger secured to an object and a flow of air rotating the blade relative to the hanger;

FIG. 9 is a view similar to FIG. 8 illustrating a plurality of waterfowl decoy apparatuses secured to the object and a first tether extending between a second object through a plurality of sleeves and to a third object for maintaining said hanger in a generally vertical position;

FIG. 10 is a view similar to FIG. 8 illustrating a second tether extending between a sleeve and a fourth object for maintaining said hanger in a generally vertical position;

FIG. 11 is a view similar to FIG. 9 illustrating a second tether, third tether and fourth tether extending between a corresponding sleeve and the fourth object for maintaining the hanger in a generally vertical position;

FIG. 12 is a first side view of a panel for constructing a plurality of waterfowl decoys incorporating the present invention;

FIG. 13 is a rear view of FIG. 12;

FIG. 14 is a bottom view of FIG. 12;

FIG. 15 is a view similar to FIG. 12 illustrating a step of aligning a straight edge with a dark pigment dot and a light pigment dot and the subsequent step of inscribing a line adjacent to the straight edge to illustrate the cutting vector;

FIG. 16 is a view similar to FIG. 15 illustrating a step of cutting the line for separating a first decoy blade from the sheet;

FIG. 19 is a view similar to FIG. 10 illustrating a third swivel coupling a first end of a second hanger to a bottom edge of the blade for rotating the blade relative to the second blade;

FIG. 20 is a view similar to FIG. 10 illustrating the hanger including a first bend and a second bend for positioning the first end of the hanger in a non-vertical alignment with the second end of the hanger;

Similar reference characters refer to similar parts throughout the several Figures of the drawings.

DETAILED DISCUSSION

Figure 1:
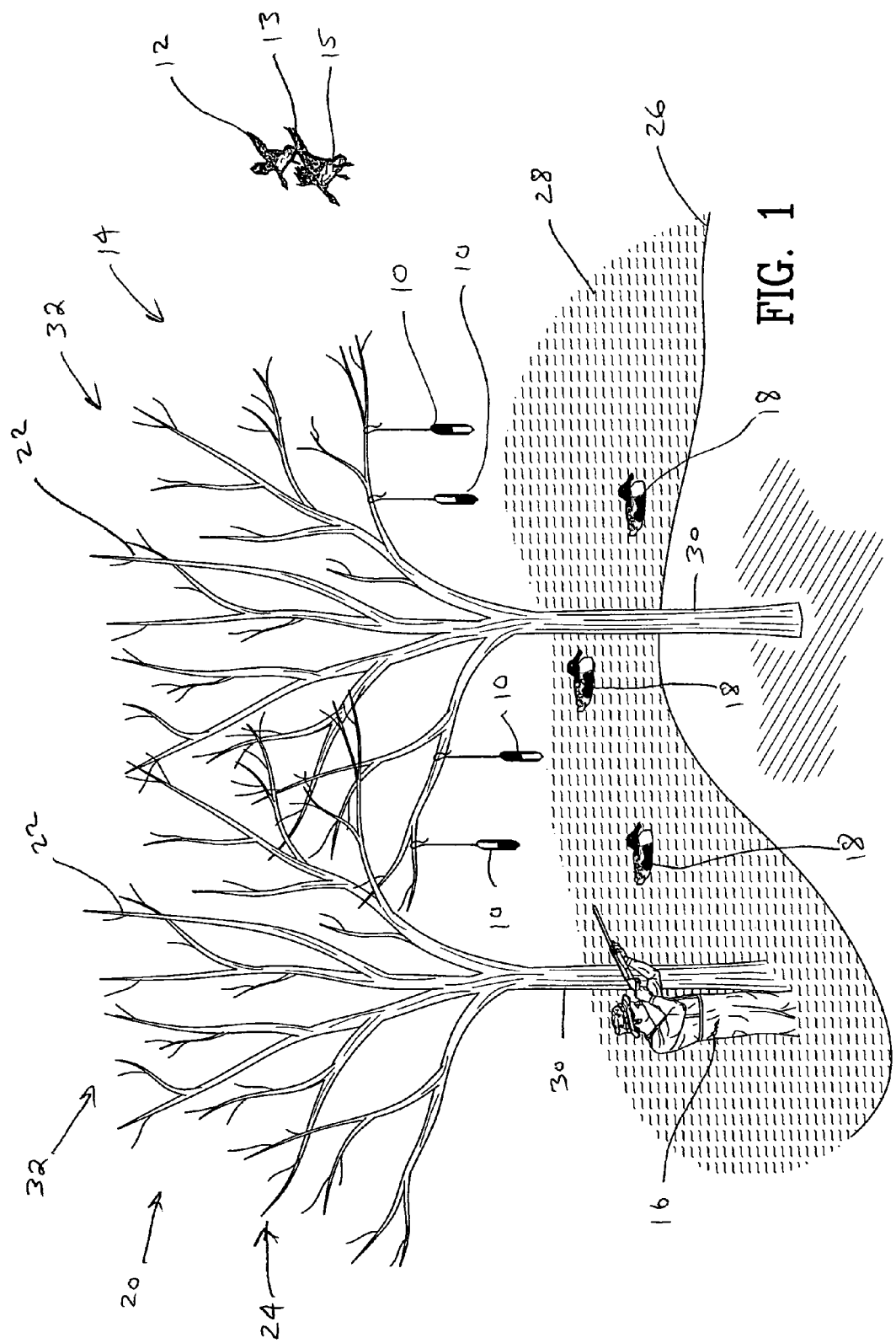
FIG. 1 is a side view of a plurality of waterfowl decoy apparatuses for attracting a waterfowl incorporating the present invention.

FIGS. 1-23 are various views of a waterfowl decoy apparatus 10 for attracting a waterfowl 12. FIG. 1 illustrate a plurality waterfowl decoy apparatus 14 for increasing the attraction of the waterfowl 12. An individual 16 may utilize the waterfowl decoy apparatus 10 for hunting purposes, birdwatching purposes, waterfowl control or other purposes. The waterfowl decoy apparatus 10 may be supported by an object 20. The object 20 in FIGS. 1, 8, 9-11, 19, 20 and 23 is shown to include a tree 22. The tree 22 elevates a crown 24 above the ground surface 26 and/or body of water 28 by a trunk 30. The crown 24 includes a plurality of branches 32. The waterfall decoy apparatus 10 may be hung from the one or more plurality of branches 32. The object 20 they further include an elevated line/wire, tripod or other support structure. A flow of air 34 traverses in proximity to the tree 22. The flow of air 34 contacts the waterfowl decoy apparatus 10 and causes a rotation of a blade 50.

As best seen in FIGS. 2-7, the waterfowl decoy apparatus 10 comprises a blade 50 defining a first side 52, a second side 54, a top edge 56, a bottom edge 58, a primary edge 60 and a secondary edge 62. The blade 50 has a generally sinusoidal cross-section 64 for defining a first concave portion 66, a second concave portion 68 and an inflection axis 70. The inflection axis 70 extends between the top edge 56 and the bottom edge 58 and bisects the first concave portion 66 and the second concave portion 68. The blade 50 may be constructed from a polymeric, metallic or other construction material.

The blade 50 includes a dark pigment 80 on the first side 52 of the blade 50. A light pigment 82 is on the second side 54 of the blade 50. FIGS. 4, 5 and 6 illustrate a more specific embodiment of waterfowl decoy apparatus 10 wherein the first side 52 includes an upper half portion 84 and a lower half portion 86. The second side 54 includes an upper half portion 90 and a lower half portion 92. The upper half portion 84 of the first side 52 has a first light pigment 100. The lower half portion 86 of the first side 52 has a first dark pigment 102. The upper half portion 90 of the second side 54 has a second dark pigment 104. The lower half portion 92 of the second side 54 has a second light pigment 106. The first light pigment 100 and the second dark pigment 104 create an upper oscillating image 110 upon rotation of the blade 50. The upper oscillating image 110 attracts the waterfowl 12 to the waterfowl decoy apparatus 10. The first dark pigment 102 and second light pigment 106 create a lower oscillating image 112 upon rotation of the blade 50. The lower oscillating image 112 attracts the waterfowl 12 to the waterfowl decoy apparatus 10.

FIGS. 2, 3, 4 and 6 illustrate the secondary edge 62 including a first upper taper 120 and a first lower taper 122. The first upper taper 120 defines a first arcuate edge 124 extending between the secondary edge 62 and the top edge 56. The first lower taper 122 defines a second arcuate edge 126 extending between the secondary edge 62 and the bottom edge 58. The primary edge 60 includes a second upper taper 130 and a second lower taper 132. The second upper taper 130 defines a third arcuate edge 134 extending between the primary edge 60 and the top edge 56. The second lower taper 132 defines a forth arcuate edge 136 extending between the primary edge 60 and the bottom edge 58. The secondary edge 62, first arcuate edge 124, the top edge 56, the third arcuate edge 134 and the primary edge 60 form an upper elliptical wing planform 140. Similarly, the secondary edge 62, the second arcuate edge 126, the bottom edge 58, the fourth arcuate edge 136 and the primary edge 60 form a lower elliptical wing planform 142. The upper elliptical wing planform 140 and the lower elliptical wing planform 142 improve aerodynamic efficiency of the blade 50 by providing a minimum of induced drag for a given aspect ratio.

FIGS. 2, 3, 8-11, 19, 20 and 23 illustrate the blade 50 hung from the object 20 by a hanger 150. The hanger 150 extends between a first end 152 and a second end 154. The first end 152 of the hanger 150 is secured to the object 20. The first end 152 of the hanger 150 may include a hook 156. The hook 156 extends from a shank portion 158, a bend portion 160 and a hook end 162. The shank portion 158, the bend portion 160 and the hook end 162 define a channel 164 for receiving the object 20. The hook end 162 may include a first coupling eye 166 for creating a blunt end 168. The second end 154 may include a second coupling eye 170. A closure latch 172 extends between the shank portion 158 and the hook end 162 for preventing the object 20 from disengaging with the channel 164. The closure latch 172 may include a pivoting latch device, rubberband, or other devices. The hanger 150 is preferably constructed from a metallic rod such as a metal rod cloths hanger, however may include a polymeric rod or flexible lanyard or from a combination of aforementioned materials. A swivel 173 couples the second end 154 of the hanger 150 to the top edge 56 of the blade 50 for rotating the blade 50 relative to the hanger 150.

The positioning of the waterfowl decoy apparatus 10 may be difficult within a tree 22 where the plurality of branches 32 are dense. As illustrated in FIG. 20 the waterfowl decoy apparatus 10 may be customized for positioning within a dense plurality of branches 32. More specifically, the hanger 150 may have a first bend 174 and a second bend 176 for positioning the first end 152 of the hanger 150 in a non-vertical alignment 178 with the second end 154 of the hanger 150. The non-vertical alignment 178 permits displacing the blade 50 in a plurality of locations relative to the hook 156 for avoiding the plurality of branches 32 or other structure.

As seen in FIGS. 2-11, 19, 20 and 23, the flow of air 34 causes the blade 50 to rotate relative to the hanger 150. More specifically, the flow of air 34 creates a high atmospheric pressure 180 adjacent to the first side 52 of the first concave portion 66 and a low atmospheric pressure 182 adjacent to the second side 54 of the second concave portion 68. A difference with atmospheric pressure 184 between the high atmospheric pressure 180 and the low atmospheric pressure 182 causes rotation of the blade upon the swivel 173. The dark pigment 80 and the light pigment 82 create an oscillating image 114 upon rotating of the blade 50 for attracting the waterfowl 12.

FIGS. 9, 10, 11, 19, illustrate a tether device 190 for maintaining one or more waterfowl decoy apparatuses 10 in a generally vertical position. If the flow of air 34 is large the waterfowl decoy apparatus 10 may be displaced from a vertical position 186 to a non-vertical position and may also cause the blade 50 to violently swing in multiple directions. The aerodynamic efficiency of the blade 50 will decrease upon an increase in a non-vertical position. The tether device 190 may be utilized to prevent the flow of air 34 from positioning the blade 50 into an excessive non-vertical position and prevent the blade 50 from swinging violently in multiple directions. The tether device 190 extends between the hanger 150 and a second object 36. The second object 36 may similarly include a tree 22, elevated line/wire, tripod or other support structure.

The tether device 190 may include a sleeve 192 having a shaft bore 194. The shaft bore 194 of the sleeve 192 slidably engaging the hanger 150 for varying the position of the sleeve 192 relative to the first end 152 and the second end 154 of the hanger 150. A tether 196 extends between the sleeve 192 and a second object 36 for maintaining the hanger 150 in a generally vertical position. The sleeve 192 may be constructed from a wooden dowel, polymeric dowel or other material. The tether 196 may be constructed from a cotton string, polymeric string or metallic string.

As seen in FIG. 9, the sleeve 192 may have a generally horizontal tether bore or first tether bore 200 through the sleeve 192. The tether 196 traverses the generally horizontal tether bore 200 and is secured between the second object 36 and a third object 38 for maintaining one or more waterfowl decoy apparatuses 10 in a generally vertical position. As seen in FIG. 10, the sleeve may have a generally vertical tether bore or second tether bore 202 through the sleeve 192. The tether 196 traverses the generally vertical tether bore 202 and is secured to a second object 36 for maintaining the waterfowl decoy apparatuse 10 in a generally vertical position. As seen in FIG. 11, both the generally horizontal tether bore 200 and the generally vertical tether bore 202 are utilized with a multiple of waterfowl decoy apparatuses 10. The tether 196 traverses the generally horizontal tether bore 200 and is secured between the second object 36 and a third object 38 for maintaining the waterfowl decoy apparatus 10, a second decoy apparatus 40 and a third decoy apparatus 42 in a generally vertical position. In addition, a second tether 204, a third tether 206 and a fourth tether 208 traverses the generally vertical tether bore 202 of the waterfowl decoy apparatus 10, the second decoy apparatus 40 and the third decoy apparatus 42 respectively and are secured to the fourth object 39 for maintaining the waterfowl decoy apparatuse 10 in a generally vertical position.

FIGS. 9 and 11 illustrates the waterfowl decoy apparatus 10 utilized with the second decoy apparatus 40 and the third decoy apparatus 42 to further attracting the waterfowl 12. Similar to the waterfowl decoy apparatus 10, the second decoy apparatus 40 and the third decoy apparatus 42 include a second blade 50A defining a first side 52A, a second side 54A, a top edge 56A, a bottom edge 58A, a primary edge 60A and a secondary edge 62A. The second blade 50A has a generally sinusoidal cross-section 64A for defining a first concave portion 66A, a second concave portion 68A and an inflection axis 70A. The inflection axis 70A of the second blade 50A extends between the top edge 56A and the bottom edge 58A and bisects the first concave portion 66A and the second concave portion 68A. The second blade 50A may be constructed from a polymeric, metallic or other construction material.

The second blade 50A includes a dark pigment 80A on the first side 52A of the second blade 50A. A light pigment 82A is on the second side 54A of the second blade 50A. In a more specific embodiment of second blade 50A wherein the first side 52A includes an upper half portion 84A and a lower half portion 86A. The second side 54A includes an upper half portion 90A and a lower half portion 92A. The upper half portion 84A of the first side 52A has a first light pigment 100A. The lower half portion 86A of the first side 52A has a first dark pigment 102A. The upper half portion 90A of the second side 54A has a second dark pigment 104A. The lower half portion 92A of the second side 54A has a second light pigment 106A. The first light pigment 100A and the second dark pigment 104A create an upper oscillating image 110A upon rotation of the second blade 50A. The upper oscillating image 110A attracts the waterfowl 12 to the second waterfowl decoy apparatus 40 and the third decoy apparatus 42. The first dark pigment 102A and second light pigment 106A create a lower oscillating image 112A upon rotation of the blade 50A. The lower oscillating image 112A attracts the waterfowl 12 to the second waterfowl decoy apparatus 40 and the third decoy apparatus 42.

The primary edge 60A including a first upper taper 120A and a first lower taper 122A. The first upper taper 120A defines a first arcuate edge 124A extending between the primary edge 60A and the top edge 56A. The first lower taper 122A defines a second arcuate edge 126A extending between the primary edge 60A and the bottom edge 58A. The secondary edge 62A includes a second upper taper 130A and a second lower taper 132A. The second upper taper 130A defines a third arcuate edge 134A extending between the secondary edge 62A and the top edge 56A. The second lower taper 132A defines a forth arcuate edge 136A extending between the secondary edge 62A and the bottom edge 58A. The primary edge 60A, first arcuate edge 124A, the top edge 56A, the third arcuate edge 134A and secondary edge 62A form an upper elliptical wing planform 140A. Similarly, the secondary edge 62A, the second arcuate edge 126A, the bottom edge 58A, the fourth arcuate edge 136A and the primary edge 60A form a lower elliptical wing planform 142A. The upper elliptical wing planform 140A and the lower elliptical wing planform 142A improve aerodynamic efficiency of the blade 50A by providing a minimum of induced drag for a given aspect ratio.

A second hanger 150A extends between a first end 152A and a second end 154A. The first end 152A of the second hanger 150A is secured to the object 20. The first end 152A of the second hanger 150A may include a hook 156A. The hook 156A extends from a shank portion 158A, a bend portion 160A and a hook end 162A. The shank portion 158A, the bend portion 160A and the hook end 162A define a channel 164A for receiving the object 20. The hook end 162A may include a first coupling eye 166A for creating a blunt end 168A. The second end 154A may include a second coupling eye 170A. A closure latch 172A extends between the shank portion 158A and the hook end 162A for preventing the object 20 from disengaging with the channel 164A. The closure latch 172A may include a pivoting latch device, rubber-band, or other devices. The second hanger 150A is preferably constructed from a metallic rod such as a metal rod cloths hanger, however may include a polymeric rod or flexible lanyard. A second swivel 173A couples the second end 154A of the second hanger 150A to the top edge 56A of the second blade 50A for rotating the second blade 50A relative to the second hanger 150A.

The positioning of the second waterfowl decoy 40 and the third waterfowl decoy 42 may be difficult within a tree 22 where the plurality of branches 32 are dense. The second waterfowl decoy 40 and the third waterfowl decoy 42 may be customized for positioning within a dense plurality of branches 32. More specifically, the second hanger 150A may have a first bend 174A and a second bend 176A for positioning the first end 152A of the second hanger 150A in a non-vertical alignment 178A with the second end 154A of the second hanger 150A. The non-vertical alignment 178A permits displacing the second blade 50A in a plurality of locations relative to the hook 156A for avoiding the plurality of branches 32 or other structure.

As seen in FIGS. 9, 11 and 19, the flow of air 34 causes the second blade 50A to rotate relative to the second hanger 150A. More specifically, the flow of air 34 creates a high atmospheric pressure 180A adjacent to the first side 52A of the first concave portion 66A and a low atmospheric pressure 182A adjacent to the second side 54A of the second concave portion 68A. A difference with atmospheric pressure 184A between the high atmospheric pressure 180A and the low atmospheric pressure 182A causes rotation of the second blade 50A upon the second swivel 173A. The dark pigment 80A and the light pigment 82A create an oscillating image 114A upon rotating of the second blade 50A for attracting the waterfowl 12.

FIG. 19 illustrate the second blade 50A a third swivel 173B coupling the first end 152A of the second hanger 150A to the bottom edge 58 of the blade 50 for rotating the blade 50 relative to the second blade 50A. The flow of air 34 contacting the second blade 50A for creating a high atmospheric pressure 180A adjacent to the first side 52A of the first concave portion 66A and a low atmospheric pressure 182A adjacent to the second side 54A of the second concave portion 68A. The high atmospheric pressure 180A and the low atmospheric pressure 182A rotating the second blade 50A. The dark pigment 80A and the light pigment 82A of the second blade 50A creating an second oscillating image 114A upon rotating of the second blade 50A for attracting the waterfowl 12.

FIGS. 12-17 illustrate a panel 210 for constructing a plurality of waterfowl decoys 212. The panel 210 comprises a sheet 214 defining a first side 216, a second side 218, a top edge 220, a bottom edge 222, a primary edge 224 and a secondary edge 226. The sheet 214 has a generally sinusoidal cross-section 228 for defining a plurality of first concave portions 230, a plurality of second concave portions 232 and a plurality of inflection axes 234. The plurality of inflection axes 234 extend between the top edge 220 and the bottom edge 222 and bisects each of the plurality of first concave portions 230 and the plurality of second concave portions 232.

The first side 216 includes an upper half portion 236 and a lower half portion 238. The second side 218 include an upper half portion 240 and a lower half portion 242. The upper half portion 236 of the first side 216 has a first light pigment 244. The lower half portion 238 of the first side 216 has a first dark pigment 246. The upper half portion 240 of the second side 218 has a second dark pigment 248. The lower half portion 242 of the second side 218 has a second light pigment 250. A dark pigment dot 252 is positioned within the first light pigment 244 of the upper half portion 236 of the first side 216 and aligning with a first inflection axis 254 of the plurality of inflection axes 234. A light pigment dot 256 is positioned within the first dark pigment 246 of the lower half portion 238 of the first side 216 and aligning with the first inflection axis 254 of the plurality of inflection axes 234.

FIG. 15 illustrates the dark pigment dot 252 and the light pigment dot 256 defining a cutting vector 258 for positioning a straight edge 260 adjacent to the panel 210. A writing instrument 262 is utilized to scribing a line 264 through the dark pigment dot 252 and the light pigment dot 256 between the top edge 220 and the bottom edge 222. As seen in FIG. 16, a cutting instrument 266 is then utilized for separating of a first decoy blade 50 from the sheet 214.

A second dark pigment dot 268 is positioned within the first light pigment 244 of the upper half portion 236 of the first side 216 and aligning with a second inflection axis 270 of the plurality of inflection axes 234. A second light pigment dot 272 is positioned within the first dark pigment 246 of the lower half portion 238 of the first side 216 and aligning with the second inflection axis 270 of the plurality of inflection axes 234. The second dark pigment dot 268 and the second light pigment dot 272 define a second cutting vector 274 for positioning a straight edge 260 adjacent to the panel 210. A writing instrument 262 is utilized to scribing a second line 276 through the second dark pigment dot 268 and the second light pigment dot 272 between the top edge 220 and the bottom edge 222. The cutting instrument 266 is then utilized for separating of a second decoy blade 50A from the sheet 214.

As shown in FIG. 12, 13, 15-17, the dark pigment dot 252 and the top edge 220 defining a first taper vector 278 for positioning a separation of a first arcuate portion 280 and forming the first arcuate edge 282. Similarly, the light pigment dot 256 and the bottom edge 222 defining a second taper vector 284 for positioning a separation of a second arcuate portion 286 and forming the second arcuate edge 288. The primary edge 224 and the top edge 220 define a third taper vector 290 for positioning a separation of a third arcuate portion 292 and forming the third arcuate edge 294. The secondary edge 226 and the bottom edge 222 define a fourth taper vector 296 for positioning a separation of a fourth arcuate portion 298 and forming the fourth arcuate edge 300. The first arcuate edge 282 and the third arcuate edge 294 form an upper elliptical wing 140 and the second arcuate edge 288 and the fourth arcuate edge 300 form a lower elliptical wing 142.

The top edge 220 of the sheet 214 includes a hanger aperture 302 aligning with a third inflection axis 304 of the plurality of inflection axes 234. The third inflection axes 304 is adjacent to the first inflection axis 254 for centering the hanger aperture 302 between one of the plurality of first concave portions 230 and one of the plurality of second concave portions 232.

FIGS. 15-18, 21 and 22 illustrate a method of constructing a plurality of waterfowl decoys 10. FIGS. 15 and 16 illustrate the method comprises the steps of aligning the straight edge 260 with the dark pigment dot 252 and the light pigment dot 256. A line 264 is then inscribed adjacent to the straight edge 260 to illustrate the cutting vector 258. The line 264 is then cut for separating a first decoy blade 50 from the sheet 214.

Figure 17:
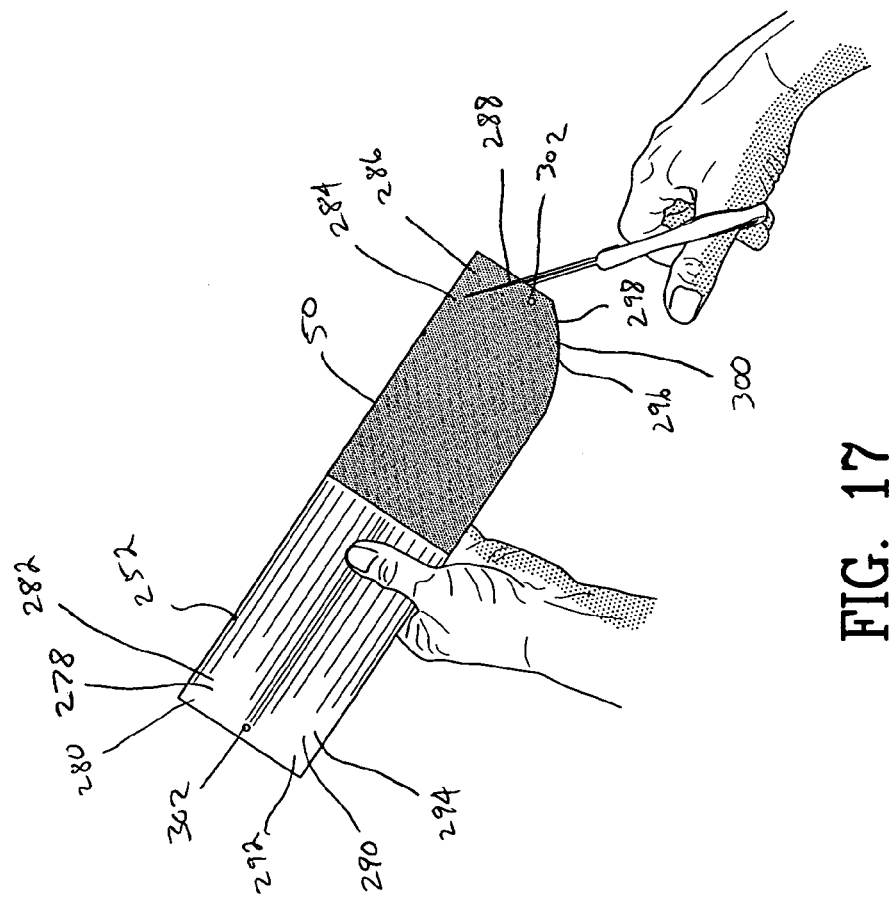
FIG. 17 is a view similar to FIG. 16 illustrating a step of cutting a first arcuate edge and a third arcuate edge for forming an upper elliptical wing.

FIG. 17 illustrates a further step including cutting a first arcuate edge 124 from the dark pigment dot 252 to the top edge 220 and a third arcuate edge 134 from the primary edge 224 to the top edge 220 or forming an upper elliptical wing 140. A further step includes cutting a second arcuate edge 126 from the light pigment dot 256 to the bottom edge 222 and a fourth arcuate edge 136 from the secondary edge 226 to the bottom edge 222 for forming an lower elliptical wing 142.

Figure 18:
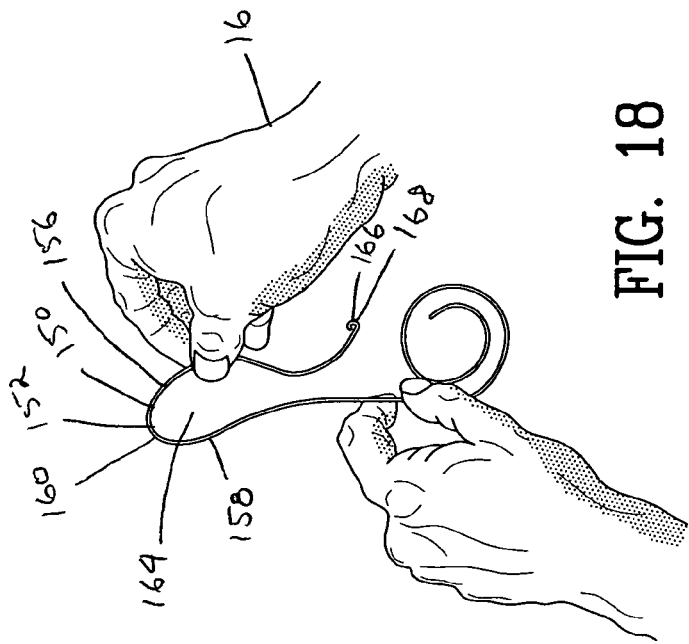
FIG. 18 illustrates a step of bending the hanger from a coiled position to an elongated position as seen in FIG. 2.

FIG. 18 illustrates a further step includes bending the hanger 150 for extending between a first end 152 and a second end 154. The hook 156 is constructed by bending the first end 152. The second coupling eye 166 is constructed by bending the second end 154. The swivel 173 is then coupled between the second end 154 of the hanger 150 to the top edge 56 of the blade 50 for rotating the blade 50 relative to the hanger 150. The first end 152 of the hanger 150 is then hung to form the object 20. A further step may include install the tether device 190 a between the hanger 150 and the second object 36. An addition step may include bending the hanger 150 for defining the first bend 174 and the second bend 176 for positioning the first end 152 of the hanger 150 in a non-vertical alignment 178 with the second end 154 of the hanger 150.

Figure 21:
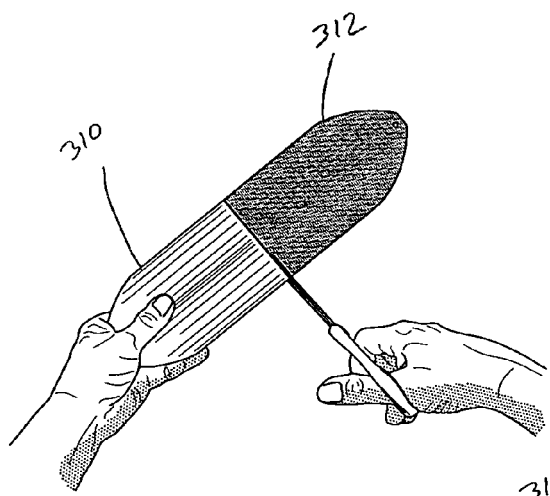
FIG. 21 is a view similar to FIG. 17 illustrating the step of cutting the first decoy blade into a first half blade and a second half blade.
Figure 22:
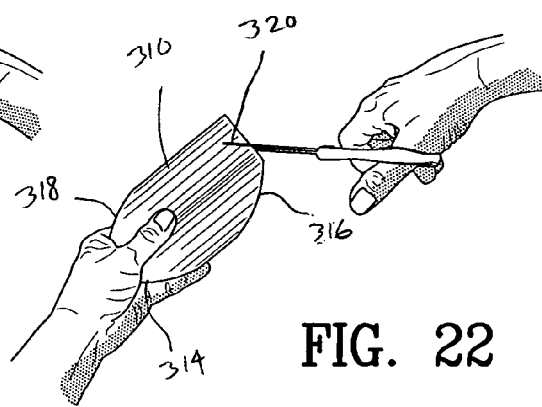
FIG. 22 is a view similar to FIG. 21 illustrating the step of cutting a fifth arcuate edge and a sixth arcuate edge for forming a first half elliptical wing.
Figure 23:
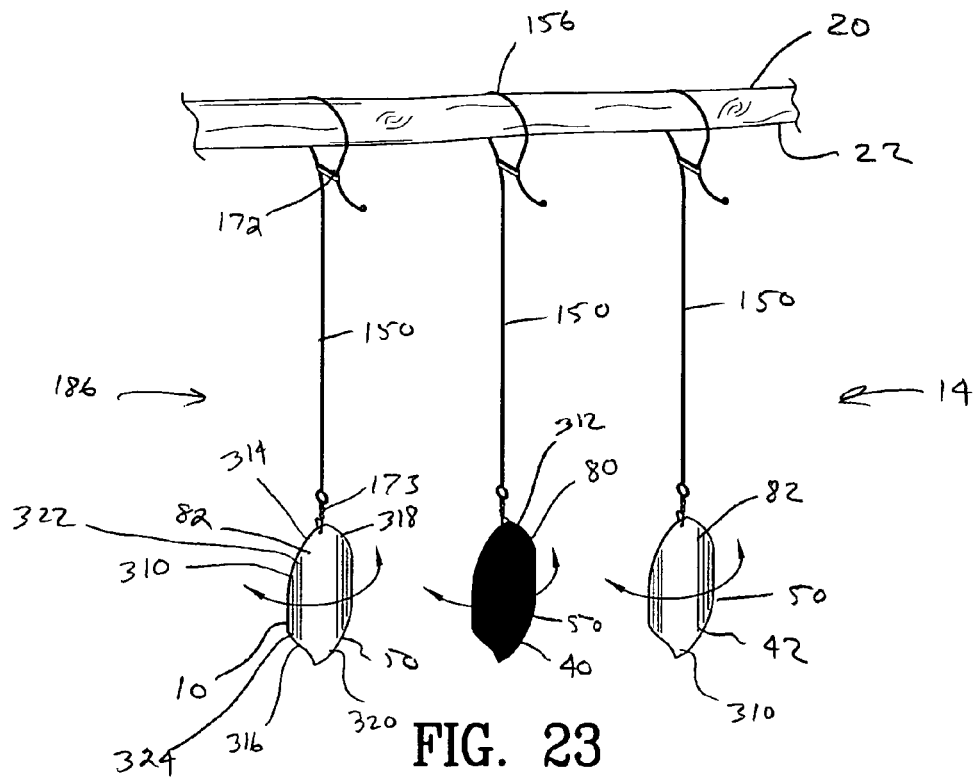
FIG. 23 is a view similar to FIG. 9 illustrating a plurality of half elliptical wings secured to the object.

FIGS. 21-23 illustrate the blade 50 being further divided into an upper half blade 310 and a lower half blade 312. Thereafter, as seen in FIG. 22 a fifth arcuate edge 314 and a sixth arcuate edge 316 are created by removing a fifth arcuate portion 318 and a sixth arcuate portion 320 respectively. The primary edge 60, first arcuate edge 124, the top edge 56, the third arcuate edge 134 and secondary edge 62 form an upper half elliptical wing planform 322. Similarly, the secondary edge 62, the fifth arcuate edge 314, the sixth arcuate portion 320 and the primary edge 60 form a lower half elliptical wing planform 324. The upper half elliptical wing planform 322 and the lower half elliptical wing planform 324 improve aerodynamic efficiency of the upper half blade 310 and the lower half blade 312 by providing a minimum of induced drag for a given aspect ratio.

The positioning of the one or more waterfowl decoy apparatus 10 may include a low placement within the plurality of branches 32 above the water for attracting ducks 13. A plurality of flowing waterfowl decoy 18 may be utilized with the one or more waterfowl decoy apparatus 10 Alternatively, the positioning of the one or more waterfowl decoy apparatus 10 may a high placement within the plurality of branches 32 for attracting doves 15.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A panel for constructing a plurality of waterfowl decoys, the panel comprising:
   a sheet defining a first side, a second side, a top edge, a bottom edge, a primary edge and a secondary edge;
   said sheet having a generally sinusoidal cross-section for defining a plurality of first concave portions, a plurality of second concave portions and a plurality of inflection axes;
   said plurality of inflection axes extending between said top edge and said bottom edge and transitioning from said plurality of first concave portions to said plurality of second concave portions;
   said first side including an upper half portion and a lower half portion;
   said second side including an upper half portion and a lower half portion;
   said upper half portion of said first side having a first light pigment;
   said lower half portion of said first side having a first dark pigment;
   said upper half portion of said second side having a second dark pigment;
   said lower half portion of said second side having a second light pigment;
   a dark pigment marker positioned within said first light pigment of said upper half portion of said first side and aligning with a first inflection axis of said plurality of inflection axes;
   a light pigment marker positioned within said first dark pigment of said lower half portion of said first side and aligning with said first inflection axis of said plurality of inflection axes;
   a cutting vector defined by said dark pigment marker and said light pigment marker; and
   a first decoy blade and a second decoy blade created by separating said sheet along said cutting vector.

2. A panel for constructing a plurality of waterfowl decoys as set forth in claim 1, wherein said top edge of said sheet includes a hanger aperture aligning with a third inflection axis of said plurality of inflection axes; and
   said third inflection axis being adjacent to said first inflection axis for centering said hanger aperture between one of said plurality of first concave portions and one of said plurality of second concave portions.

3. A panel for constructing a plurality of waterfowl decoys, the panel comprising:
   a sheet defining a first side, a second side, a top edge, a bottom edge, a primary edge and a secondary edge;
   said sheet having a generally sinusoidal cross-section for defining a plurality of first concave portions, a plurality of second concave portions and a plurality of inflection axes;
   said plurality of inflection axes extending between said top edge and said bottom edge and transitioning from said plurality of first concave portions to said plurality of second concave portions;
   said first side including an upper half portion and a lower half portion;
   said second side including an upper half portion and a lower half portion;
   said upper half portion of said first side having a first light pigment;
   said lower half portion of said first side having a first dark pigment;
   said upper half portion of said second side having a second dark pigment;
   said lower half portion of said second side having a second light pigment;
   a dark pigment dot positioned within said first light pigment of said upper half portion of said first side and aligning with a first inflection axis of said plurality of inflection axes;
   a light pigment dot positioned within said first dark pigment of said lower half portion of said first side and aligning with said first inflection axis of said plurality of inflection axes;
   said dark pigment dot and said light pigment dot defining a cutting vector for positioning a separation of a first decoy blade from said sheet;
   a second dark pigment dot positioned within said first light pigment of said upper half portion of said first side and aligning with a second inflection axis of said plurality of inflection axes;
   a second light pigment dot positioned within said first dark pigment of said lower half portion of said first side and aligning with said second inflection axis of said plurality of inflection axes; and
   said second dark pigment dot and said second light pigment dot defining a second cutting vector for positioning a separation of a second decoy blade from said sheet.

4. A panel for constructing a plurality of waterfowl decoys, the panel comprising:
   a sheet defining a first side, a second side, a top edge, a bottom edge, a primary edge and a secondary edge;

said sheet having a generally sinusoidal cross-section for defining a plurality of first concave portions, a plurality of second concave portions and a plurality of inflection axes;

said plurality of inflection axes extending between said top edge and said bottom edge and transitioning from said plurality of first concave portions to said plurality of second concave portions;

said first side including an upper half portion and a lower half portion;

said second side including an upper half portion and a lower half portion;

said upper half portion of said first side having a first light pigment;

said lower half portion of said first side having a first dark pigment said upper half portion of said second side having a second dark pigment;

said lower half portion of said second side having a second light pigment;

a dark pigment dot positioned within said first light pigment of said upper half portion of said first side and aligning with a first inflection axis of said plurality of inflection axes;

a light pigment dot positioned within said first dark pigment of said lower half portion of said first side and aligning with said first inflection axis of said plurality of inflection axes;

said dark pigment dot and said light pigment dot defining a cutting vector for positioning a separation of a first decoy blade from said sheet;

a second dark pigment dot positioned within said first light pigment of said upper half portion of said first side and aligning with a second inflection axis of said plurality of inflection axes;

a second light pigment dot positioned within said first dark pigment of said lower half portion of said first side and aligning with said second inflection axis of said plurality of inflection axes;

said second dark pigment dot and said second light pigment dot defining a second cutting vector for positioning a separation of a second decoy blade from said sheet;

said dark pigment dot and said top edge defining a first taper vector for positioning a separation of a first arcuate portion and forming a first arcuate edge;

said light pigment dot and said bottom edge defining a second taper vector for positioning a separation of a second arcuate portion and forming a second arcuate edge;

said primary edge and said top edge defining a third taper vector for positioning a separation of a third arcuate portion and forming a third arcuate edge;

said secondary edge and said bottom edge defining a fourth taper vector for positioning a separation of a fourth arcuate portion and forming a fourth arcuate edge;

said first arcuate edge and said third arcuate edge forming an upper elliptical wing; and said second arcuate edge and said fourth arcuate edge forming a lower elliptical wing.

\* \* \* \* \*